US006567557B1

(12) United States Patent
Sigmund

(10) Patent No.: US 6,567,557 B1
(45) Date of Patent: May 20, 2003

(54) METHOD FOR PREVENTING DUAL-STEP HALF-PIXEL MOTION COMPENSATION ACCUMULATION ERRORS IN PREDICTION-RICH MPEG-2 SEQUENCES

(75) Inventor: Ulrich Sigmund, Karlsruhe (DE)

(73) Assignee: STMicroelectronics, Inc., Carrolton, TX (US)

( * ) Notice: Subject to any disclaimer, the term of this patent is extended or adjusted under 35 U.S.C. 154(b) by 0 days.

(21) Appl. No.: 09/467,552

(22) Filed: Dec. 10, 1999

(51) Int. Cl.⁷ .................................................. G06K 9/36
(52) U.S. Cl. ...................... 382/233; 382/236; 382/238; 382/243; 382/244; 382/248; 382/251; 375/240.2; 375/240.16; 375/240.19
(58) Field of Search ................................ 382/232, 233, 382/236, 245, 247, 248, 250, 251, 252, 253; 375/240.12, 240.13, 240.14, 240.15, 240.16, 240.17, 240.18, 240.19, 240.2, 240.21, 240.22, 240.23, 240.24, 240.27

(56) References Cited

U.S. PATENT DOCUMENTS

| 5,708,473 | A | * | 1/1998 | Mead ........................ 348/699 |
| 5,850,258 | A | | 12/1998 | Kang ......................... 348/390 |
| 6,058,143 | A | * | 5/2000 | Golin ......................... 348/446 |
| 6,269,484 | B1 | * | 7/2001 | Simsic et al. ................ 348/448 |
| 6,282,243 | B1 | * | 8/2001 | Kazui et al. .............. 348/402.1 |
| 6,285,713 | B1 | * | 9/2001 | Nakaya et al. ......... 375/240.17 |
| 6,295,376 | B1 | * | 9/2001 | Nakaya ................. 375/240.17 |

FOREIGN PATENT DOCUMENTS

| EP | 0 903 944 | 3/1994 | ....................... 7/30 |
| EP | 0 712 249 | 5/1996 | ....................... 7/24 |
| EP | 0 735 769 | 10/1996 | ....................... 7/26 |
| EP | 0 914 009 | 10/1998 | ....................... 7/62 |
| EP | 0 948 214 | 3/1999 | ....................... 7/62 |
| EP | 0 710 027 | 5/2001 | ....................... 7/24 |
| WO | 95/35628 | 12/1995 | ....................... 7/26 |
| WO | 98/43167 | 10/1997 | ....................... 12/2 |
| WO | 99/10811 | 3/1999 | ....................... 12/2 |

OTHER PUBLICATIONS

Eddy Greef, et al.; *Memory Size Reduction Through Storage Order Optimization for Embedded Parallel Multimedia Applications*: Dec. 1, 1997; Parallel Computing.

Lee, et al.: *Evaluation of a High–Performance Object Reuse Dynamic Memory Allocation Policy for C++ Programs*; 2000; Proceedings Fourth International Conference/Exhibition on High Performance Computing in the Asia–Pacific Region.

* cited by examiner

Primary Examiner—Jayanti K. Patel
Assistant Examiner—Ali Bayat
(74) Attorney, Agent, or Firm—Glenn Patent Group; Michael A. Glenn; Don Hendricks

(57) ABSTRACT

A two-step motion prediction for MPEG-2 interpolation case-D will yield visual artifacts if not corrected. An improved MPEG-2 decoder includes a logic gate, multiplexer, and adder. When both the horizontal ($h_0$) and vertical ($h_1$) motion vector components require a half pixel interpolation (case-D), the multiplexer forwards the constant minus three to the adder, otherwise a constant zero is used. Such adder modifies the DC coefficient input to the inverse discrete cosine transformer to include a correction term for the predicted pixels calculated by a two-step predictor. A correction value of −0.375 is evenly distributed over all sixty-four resulting spatial coefficients during the inverse discrete cosine transform. This results statistically in a slightly brighter set of correction terms. Such offsets result in a slightly darker prediction that is formed by the two-step predictor. The output frames are statistically correct images.

8 Claims, 2 Drawing Sheets

METHOD FOR PREVENTING DUAL-STEP HALF-PIXEL MOTION COMPENSATION ACCUMULATION ERRORS IN PREDICTION-RICH MPEG-2 SEQUENCES

BACKGROUND OF THE INVENTION

1. Technical Field

The present invention relates to computer and digital data compression, and more specifically to preventing rounding errors that can accumulate in MPEG-2 type decompression.

2. Description of the Prior Art

Digitized images require a large amount of storage space to store and a large amount of bandwidth to transmit. A single, relatively modest-sized image, having 480 by 640 pixels and a full-color resolution of twenty-four bits per pixel (three 8-bit bytes per pixel), occupies nearly a megabyte of data. At a resolution of 1024 by 768 pixels, a 24-bit color screen requires 2.3 megabytes of memory to represent. A 24-bit color picture of an 8.5 inch by 11 inch page, at 300 dots per inch, requires as much as twenty-five megabytes to represent.

Video images are even more data-intensive, since it is generally accepted that for high-quality consumer applications, images must occur at a rate of at least thirty frames per second. Current proposals for high-definition television (HDTV) call for as many as 1920 by 1035 or more pixels per frame, which translates to a data transmission rate of about 1.5 billion bits per second. This bandwidth requirement can be reduced somewhat if one uses 2:1 interleaving and 4:1 decimation for the "U" and "V" chrominance components, but 0.373 billion bits per second are still required.

Traditional lossless techniques for compressing digital image and video information, such as Huffman encoding, run length encoding and the Lempel-Ziv-Welch algorithm, are far from adequate to meet this demand. For this reason, compression techniques which can involve some loss of information have been devised, including discrete cosine transform techniques, adaptive discrete cosine transform techniques, and wavelet transform techniques. Wavelet techniques are discussed in DeVore, Jawerth and Lucier, *Image Compression Through Wavelet Transform Coding*, IEEE Transactions on Information Theory, Vol. 38, No. 2, pp. 719–746 (1992); and in Antonini, Barlaud, Mathieu and Daubechies, *Image Coding Using Wavelet Transform,* IEEE Transactions on Image Processing, Vol. 1, No. 2, pp. 205–220 (1992).

The Joint Photographic Experts Group (JPEG) has promulgated a standard for still image compression, known as the JPEG standard, which involves a discrete cosine transform-based algorithm. The JPEG standard is described in a number of publications, including the following incorporated by reference herein: Wallace, *The JPEG Still Picture Compression Standard,* IEEE Transactions on Consumer Electronics, Vol. 38, No. 1, pp. xviii–xxxiv (1992); Purcell, *The C-Cube CL550 JPEG Image Compression Processor,* C-Cube Microsystems, Inc. (1992); and C-Cube Microsystems, *JPEG Algorithm Overview* (1992).

An encoder using the JPEG algorithm has four steps: linear transformation, quantization, run-length encoding (RLE), and Huffman coding. The decoder reverses these steps to reconstitute the image. For the linear transformation step, the image is divided up into 8*8 pixel blocks and a Discrete Cosine Transform is applied in both spatial dimensions for each block. The purpose of dividing the image into blocks is to overcome a deficiency of the discrete cosine transform algorithm, which is that the discrete cosine transform is seriously non-local. The imager is divided into blocks in order to overcome this non-locality by confining it to small regions, and doing separate transforms for each block. However, this compromise has a disadvantage of producing a tiled appearance (blockiness) upon high compression.

The quantization step is essential to reduce the amount of information to be transmitted, though it does cause loss of image information. Each transform component is quantized using a value selected from its position in each 8*8 block. This step has the convenient side effect of reducing the abundant small values to zero or other small numbers, which can require much less information to specify.

The run-length encoding step codes runs of same values, such as zeros, in items identifying the number of times to repeat a value, and the value to repeat. A single item like "eight zeros" requires less space to represent than a string of eight zeros, for example. This step is justified by the abundance of zeros that usually result from the quantization step.

Huffman coding translates each symbol from the run-length encoding step into a variable-length bit string that is chosen depending on how frequently the symbol occurs. That is, frequent symbols are coded with shorter codes than infrequent symbols. The coding can be done either from a preset table or one composed specifically for the image to minimize the total number of bits needed.

Similarly to JPEG, the Motion Pictures Experts Group (MPEG) has promulgated two standards for coding image sequences. The standards are known as MPEG-1 and MPEG-2. The MPEG algorithms exploit the common fact of relatively small variations from frame to frame. In the MPEG standards, a full image is compressed and transmitted only once for every twelve frames. The JPEG standard is typically used to compress these "reference" or "intra" frames. For the intermediate frames, a predicted frame is calculated and only the difference between the actual frame and the, predicted frame is compressed and transmitted. Any of several algorithms can be used to calculate a predicted frame, and the algorithm is chosen on a block-by-block basis depending on which predictor algorithm works best for the particular block. Motion detection can be used in some of the predictor algorithms. MPEG 1 is described in detail in International Standards Organization (ISO) CD 11172.

Accordingly, for compression of video sequences the MPEG technique is one which treats the compression of reference frames substantially independently from the compression of intermediate frames between reference frames. The present invention relates primarily to the compression of still images and reference frames for video information, although aspects of the invention can be used to accomplish video compression even without treating reference frames and intermediate frames independently.

The above techniques for compressing digitized images represent only a few of the techniques that have been devised. However, none of the known techniques yet achieve compression ratios sufficient to support the huge still and video data storage and transmission requirements expected in the near future. The techniques also raise additional problems, apart from pure compression ratio issues. In particular, for real time, high-quality video image decompression, the decompression algorithm must be simple enough to be able to produce thirty frames of decompressed images per second. The speed requirement for compression is often not as extreme as for decompression, since for many purposes, images can be compressed in advance. Even then, however, compression time must be reasonable to achieve commercial objectives. In addition, many applications require real time compression as well as decompression, such as real time transmission of live events. Known image compression and decompression techniques which achieve high compression ratios, often do so only at the expense of requiring extensive computations either on compression or decompression, or both.

The MPEG-2 video compression standard is defined in ISO/IEC 13818-2 "Information technology—Generic coding of moving pictures and associated audio information: Video". MPEG-2 uses motion compensation on fixed sized rectangular blocks of pixel elements ("macroblocks") to use temporal locality for improved compression efficiency. The location of these "macroblocks" in the reference pictures is given on half pixel boundaries, and so requires an interpolation of pixel elements. Such interpolation is specified in the MPEG-2 standard, as follows:

```
case-A:
  if ((!half_flag[0])&&(!half_flag[1]))
      pel_pred[y][x]=pel_ref[y+int_vec[1]][x+int_vec
      [0]];
case-B:
  if ((!half_flag[0]&&half_flag[1])
      pel_pred[y][x]=(pel_ref[y+int_vec[1]][x+int_vec
      [0]]+
          pel_ref[y+int_vec[1]+1][x+int_vec[0]])//2;
case-C:
  if (half_flag[0]&&(!half_flag[1]))
      pel_pred[y][x]=(pel_ref[y+int_vec[1]][x+int_vec
      [0]]+
          pel_ref[y+int_vec[1]][x+int_vec[0]+1])//2;
case-D:
  if (half_flag[0]&&half_flag[1])
      pel_pred[y][x]=(pel_ref[y+int_vec[1]][x+int_
      vec[0]]+
          pel_ref[y+int_vec[1]][x+int_vec[0]+1]+
          pel_ref[y+int_vec[1]+1][x+int_vec[0]]+
          pel_ref[y+int_vec[1]+1][x+int_vec[0]+1])//4;
```

The "//" operator at the ends of cases B, C, and D is defined in the MPEG-2 specification as: "Integer division with rounding to the nearest integer. Half-integer values are rounded away from zero unless otherwise specified [ . . . ]". Therefore, when a two or a four are the right hand operand and the left hand operand is greater or equal zero, the operator "//" can be replaced according to: $x//2=(x+1)>>1$; $x//4=(x+2)>>2$, where ">>" denotes a binary right shift of the left hand operator by the right hand operator designated number of bits.

Since "$avg(p_{00}, p_{01}):=(p_{00}, p_{01})//2=(p_{00}, p_{01}+1)>>1$" is a simple operation to implement on a microprocessor, many commercial microprocessors include this operation as a built-in instruction. For example, "pavgusb" is included in Intel processors with the SSE extension, and AMD processors with the 3DNow! extensions. Such instruction is very useful in computing cases B and C, above.

The built-in "pavgusb" instruction is very tempting for use in implementing case-D, e.g., by executing it twice, as in "$avg(avg(p_{00}, p_{01}), avg(p_{10}, p_{11}))$". This is also an interesting alternative for a pure hardware implementation, because the circuit to implement the first step of averaging can also be used a second time to do the second step. But to do so, will generate objectionable visual artifacts.

The usual sub-routine to implement case-D requires the execution of twenty-seven instructions, as is listed in the left column of Table I. But if "pavgusb" is used, the sub-routine can be reduced to five instructions, as is listed in the right column of Table I. So the temptation to use the quicker solution for case-D is very great.

TABLE I

| Implementation without "pavgusb" | | Implementation with "pavgusb" | |
|---|---|---|---|
| pxor | mm7, mm7 | movg | mm0, [eax] |
| movq | mm0,[eax] | pavgusb | mm0, [eax+1] |
| movq | mm1, mm0 | movq | mm1, [ebx] |
| punpcklbw | mm0, mm7 | pavgusb | mm1, [ebx+1] |
| punpckhbw | mm1, mm7 | pavgusb | mm0, mm1 |
| movq | mm2, [eax+1] | | |
| movq | mm3, mm2 | | |
| punpcklbw | mm2, mm7 | | |
| punpckhbw | mm3, mm7 | | |
| paddb | mm0, mm2 | | |
| paddb | mm1, mm3 | | |
| movq | mm2, [ebx] | | |
| movq | mm3, mm2 | | |
| punpcklbw | mm2, mm7 | | |
| paddb | mm0, mm2 | | |
| paddb | mm1, mm3 | | |
| movq | mm2, [ebx+1] | | |
| movq | mm3, mm2 | | |
| punpcklbw | mm2, mm7 | | |
| punpckhbw | mm3, mm7 | | |
| paddb | mm0, mm2 | | |
| paddb | mm1, mm3 | | |
| paddb | mm0, [round_by_2] | | |
| paddb | mm1, [round_by_2] | | |
| packuswb | mm0, mm1 | | |
| 27 instructions | | 5 instructions | |

One problem with the shortcut solution is that it causes, artifacts because rounding is handled different, than the MPEG standard dictates. So to have artifact-free implementations, the short-cut solution is prohibited.

The rounding error for a specific combination of four pixels can be calculated as:

$$err(p_{00}, p_{01}, p_{10}, p_{11})=((((p_{00}+p_{01}+1)>>1)+((p_{10}+p_{11}+1)>>1)+1)>>1)-((p_{00}, p_{01}+p_{10}+p_{11}+2)>>2)$$

The overall error is only affected by the two least significant bits of each coefficient, so the total average error can be calculated as:

$$avgerr = \frac{\sum_{i=0}^{3}\sum_{j=0}^{3}\sum_{k=0}^{3}\sum_{l=0}^{3}err(i,j,k,l)}{4?4?4?4} = \frac{3}{8}.$$

The rounding error is less than one least-significant-bit for first-generation compensation, and is not a problem. But the MPEG-2 standard allows for multi-generation compensation. The consequence of this is a predicted picture can be used as a reference picture for successive pictures. When a predicted picture is used as a reference picture, rounding errors can add up to more than one least significant bit, and the accumulated rounding errors can be large enough over several compensation generations to create objectionable visual artifacts.

Such visual artifacts or optical effects are called "pumping", and are perceived by the eye as image brightening over a series of predicted pictures that jump back to normal brightness at the next intra-picture. In particular, sequences that have an unusually high number of predicted pictures between intra codes pictures can experience serious pumping. For example, field structure encoded sequences or material that lack "bi-directional" predicted pictures will suffer from pumping.

SUMMARY OF THE INVENTION

The invention comprises a method wherein two-step motion prediction errors for MPEG-2 interpolation case-D are corrected. An improved MPEG-2 decoder includes a logic gate, multiplexer, and adder. When both the horizontal ($h_0$) and vertical ($h_1$) motion vector components require a half pixel interpolation (case-D), the multiplexer forwards the constant minus three to the adder, otherwise a constant zero is used. Such adder modifies the D C coefficient input to the inverse discrete cosine transformer to include a correction term for the predicted pixels calculated by a two-step predictor. A correction value of −0.375 is evenly distributed over all sixty-four resulting spatial coefficients during the inverse discrete cosine transform. This results statistically in a slightly brighter set of correction terms. Such offsets a slightly darker prediction that are formed by the two-step predictor. The output frames are statistically correct images.

DETAILED DESCRIPTION OF THE INVENTION

Figure 1:
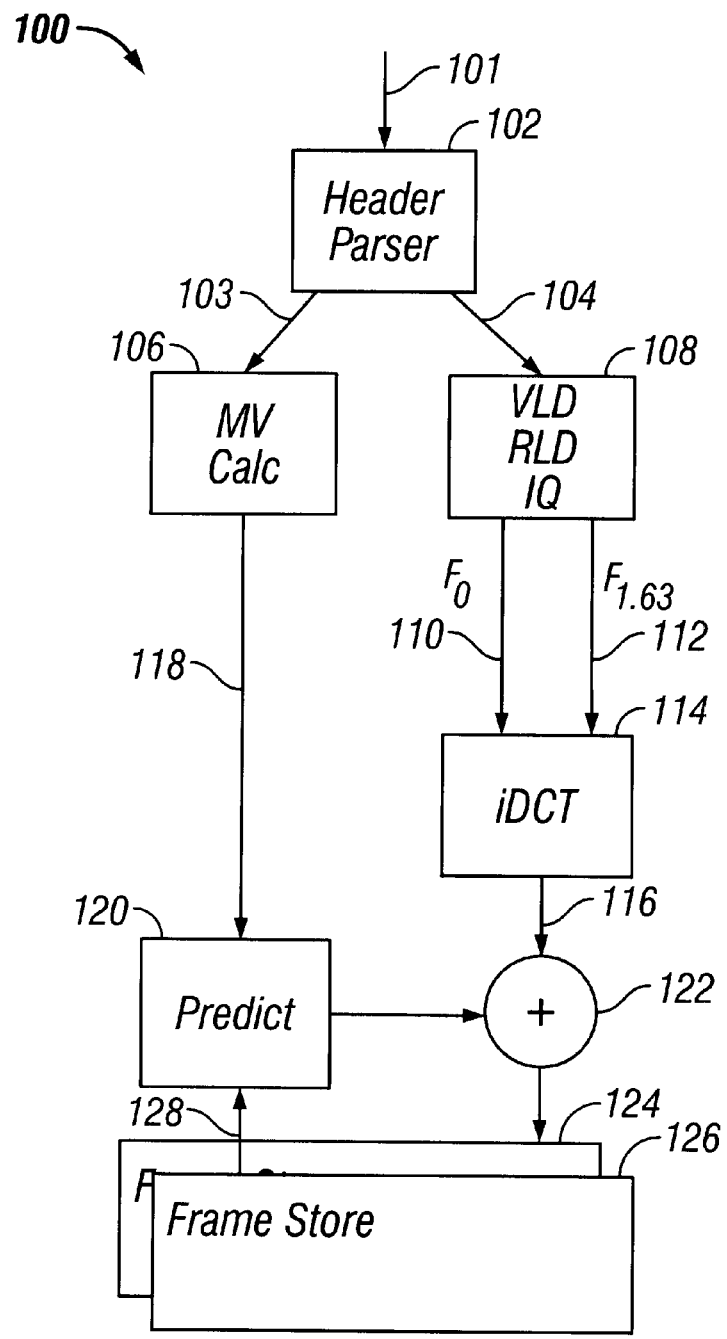
FIG. 1 is a functional block diagram of an MPEG-2 video decoding processor.

FIG. 1 is a functional block diagram of an MPEG-2 video decoding processor 100. An incoming MPEG-2 datastream 101 is received by a header parser 102 for decompression. The local spatial decorrelation methods in MPEG and JPEG are very similar. Picture data is block transform coded with the two-dimensional orthonormal 8*8 DCT. The resulting sixty-three AC transform coefficients are mapped in a zigzag pattern to statistically increase the runs of zeros. Coefficients of the vector are then uniformly scalar quantized, run-length coded, and finally the run-length symbols are variable length coded using a canonical (JPEG) or modified Huffman (MPEG) scheme. Global frame redundancy is reduced by 1-D DPCM, of the block DC coefficients, followed by quantization and variable length entropy coding.

The header parser 102 separates a motion vector information stream 103 from a compressed MPEG-2 video bit stream 104. A motion vector (MV) calculator 106 and a variable length decoder (VLD) 108 receive the separated streams. The bit stream 104 is further processed in the VLD 108 to reconstruct the original direct cunent (DC) and up to sixty-three alternating current (AC) coefficients. A run length decoder and an inverse quantization included in the VLD 108 help produce an $F_0$ stream 110 and an $F_{1..63}$ stream 112. The AC coefficients are further processed to yield the correction terms in the frequency domain. An inverse discrete cosine transformer 114 transforms the discrete cosine in the $F_0$ stream 110, and the AC coefficients in the $F_{1..63}$ stream 112 from the frequency domain back to the spatial domain. A spatial-domain output 116 is produced.

Motion vector information is used to calculate an effective motion vector output stream 118 in the MV calculator 106. A predictor 120 uses such effective motion vectors to build a prediction that is forwarded to a summer 122. A frame store 124 and 126 allow reference pictures that have been previously decoded and stored to be used later by the predictor 120. The sub-routines listed herein for MPEG-2 interpolation cases A–D are typically implemented in the construction of the predictor 120. A resulting predicted block of pixels is combined in summer 122 with the result of the inverse discrete cosine transform to yield a final reconstructed macroblock, e.g., and stored in frame stores 124 and 126.

Figure 2:
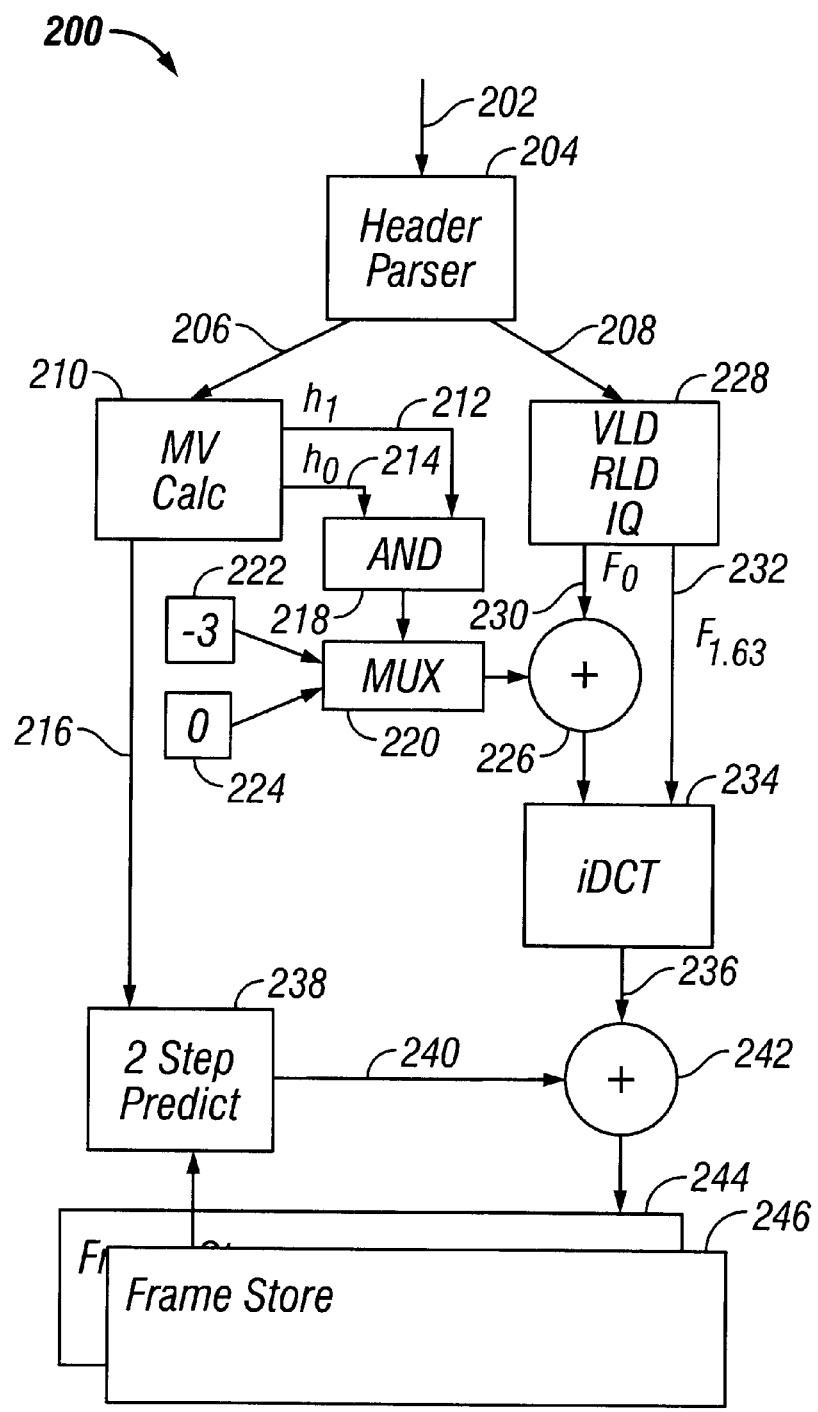
FIG. 2 is a functional block diagram of an MPEG-2 video decoder embodiment of the invention that includes dual-step half-pixel prediction.

FIG. 2 represents an MPEG-2 video decoder embodiment of the invention, and is referred to herein by the general reference numeral 200. The MPEG-2 video decoding method 200 prevents the accumution of rounding errors. Such enables the use of the improved dual-step half-pixel prediction scheme for MPEG-2 interpolation case-D. The embodiments of the present invention can also be used to improve the image quality for implementations that already use the dual-step half-pixel prediction scheme, i.e., if the steps prior to the inverse discrete cosine transform are implemented in software.

It can be assumed that the rounding error is evenly distributed over all pixels in each of the affected macroblocks. Statistics can therefore be used to prevent the negative visual effects caused by accumulating the rounding errors. In general, embodiments of the invention subtract the rounding error from all macroblocks that need MPEG-2 interpolation case-D processing. The overall error is thus eliminated.

With integer processing, it is not possible to subtract the error value after the inverse discrete cosine transformation. Fortunately, the inverse discrete cosine transform defined in the MPEG-2 decoding standard has an effective division of eight for the DC coefficient. Taking advantage of this, a correction term of 0.375 can be subtracted for all macroblocks that need case-D processing as integer value three off the DC coefficient just before the inverse discrete cosine transformation. The resulting energy, difference of twenty-four is distributed over all sixty-four transformed correction terms. This results in a statistical distribution of −0.375 that zeros-out the 0.375 error that is introduced by dual-step half-pixel prediction.

Embodiments of the invention eliminate the need to add a correction term during the averaging operation by using appropriate correction terms for the DC coefficient for all cases (A to D) before the inverse discrete cosine transform process. This could enable the use of a simple alpha blending unit in a state of the art graphics accelerator to perform motion compensation compatible with the MPEG-2 standard, without the need to enhance it with an MPEG-2.

In FIG. 2, a two-step motion prediction for MPEG-2 interpolation case-D yields visual artifacts if not corrected. The invention is placed into the embodiment, as a combination of a logic and circuit in combination with a multiplexer, and an adder. If both the horizontal ($h_0$) and vertical ($h_1$) motion vector components require a half pixel interpolation (case-D), the multiplexer forwards the constant minus three to the adder, in other cases the constant zero is used. The adder adds the outcome of the multiplexer to the DC coefficient, to form a new DC coefficient, that contains the correction term for the predicted pixels calculated by the two step predictor.

A correction value of −0.375 is evenly distributed over all sixty-four resulting spatial coefficients during the inverse discrete cosine transform. This results statistically in a slightly brighter set of correction terms. Such offsets result in a slightly darker prediction that is formed by the two-step predictor. The output frames are statistically correct images.

The decoder 200 implementation in FIG. 2 receives an MPEG-2 datastream 202 with a header parser 204. The header parser 204 separates a motion vector information stream 206 from a compressed MPEG-2 video bit stream

208. A motion vector (MV) calculator 210 produces a vertical motion vector component $h_1$ output 212, a horizontal motion vector component $h_0$ output 214, and an MV output 216. An AND-gate 218 causes a multiplexer 220 to select a minus-three value 222 or a zero value 224. When the $h_0$ output 214 and $h_1$ output 212 are both true, the minus-three value 222 will be selected and passed to an adder 226. A processor 228 includes a variable length decoder (VLD), run length decoder, and an inverse quantization unit. It produces a direct current (DC) coefficient $F_0$ output 230 and an alternating current (AC) coefficients $F_{1..63}$ output 232. The processor 228 reconstructs the original DC coefficient and up to sixty-three AC coefficients. The AC coefficients, are further processed to yield the correction terms in the frequency domain. An inverse discrete cosine transformer 234 transforms the discrete cosine in the $F_0$ stream 230 after correction by adder 226. The AC coefficients in the $F_{1..63}$ stream 232 are also transformed from the frequency domain back to the spatial domain. A spatial-domain output 236 is produced.

A two-step predictor 238 can then be used which can take advantage of the "pavgusb" instruction in some commercial microprocessors when the MPEG-2 interpolation case-D is encountered. Specifically, case-D is,

```
case-D:
   if (half_flag[0]&&half_flag[1])
      pel_pred[y][x]=(pel_ref[y+int_vec[1]][x+int_vec
         [0]]+
            pel_ref[y+int_vec[1]][x+int_vec[0]+1]+
            pel_ref[y+int_vec[1]+1][x+int_vec[0]]+
            pel_ref[y+int_vec[1]+1][x+int_vec[0]+1])//4
```

Thus, the high level programming statement, "avg(avg ($p_{00}$, $p_{01}$), avg($p_{10}$, $p_{11}$))", is allowable and now preferred in the implementation of embodiments of the invention. This, however produces an accumulated rounding error that is statistically zeroed out in an adder 242 that combines the spatial-domain output 236 and a prediction output 240. These produce a series of frame stores 244 and 246 that are referenced by the two-step predictor 238 between intra-pictures.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A method for decompressing MPEG-2 datastreams, comprising:

separating an MPEG-2 datastream into a motion vector datastream and a coefficients datastream;

using a two-step half-pixel prediction process on said motion vector datastream that produces a rounding error when a predicted frame is used as a reference frame in a subsequent prediction;

calculating motion vector components from said motion vector datastream; and modifying said coefficients datastream before entering an inverse discrete cosine transform stage if the motion vector components indicate a MPEG-2 half-pixel interpolation case-D situation, in a way that results in zeroing out of pumping artifacts in a frame store.

2. The method of claim 1, wherein:

the step of modifying is such that said inverse discrete cosine transform stage receives a DC coefficient that has been modified according to a vertical motion vector component $h_1$, a horizontal motion vector component $h_0$ output from a motion vector calculator and derived from said motion vector datastream.

3. A method for decompressing MPEG-2 datastreams, comprising:

separating an MPEG-2 datastream into a motion vector datastream and a coefficients datastream;

using a two-step half-pixel prediction process on said motion vector datastream that produces a rounding error when a predicted frame is used as a reference frame in a subsequent prediction; and modifying said coefficients datastream before entering an inverse discrete cosine transform stage in a way that results in a zeroing out of pumping artifacts in a frame store, such that said inverse discrete cosine transform stage receives a DC coefficient that has been modified according to a vertical motion vector component $h_1$, a horizontal motion vector component $h_0$ output from a motion vector calculator and derived from said motion vector datastream and such that said DC coefficient is modified by a constant if both said vertical motion vector component $h_1$ and said horizontal motion vector component $h_0$ indicate a MPEG-2 half-pixel interpolation case-D situation.

4. A method for decompressing MPEG-2 datastreams, comprising the steps of:

separating an MPEG-2 datastream into a motion vector datastream and a coefficients datastream;

using a two-step half-pixel prediction process on said motion vector datastream that produces a rounding error when a predicted frame is used as a reference frame in a subsequent prediction;

modifying said coefficients datastream before entering an inverse discrete cosine transform stage in a way that results in a zeroing out of pumping artifacts in a frame store, such that said inverse discrete cosine transform stage receives a DC coefficient that has been modified according to a vertical motion vector component $h_1$, a horizontal motion vector component $h_0$ output from a motion vector calculator and derived from said motion vector datastream;

deriving a DC coefficient and a plurality of AC coefficients from said coefficients datastream with a variable length decoder, a run length decoder, and an inverse quantization unit;

transforming said inverse discrete cosine;

adding a constant to said DC coefficient before the step of transforming;

calculating a motion vector from said motion vector datastream to produce a vertical motion vector component $h_1$ and a horizontal motion vector component $h_0$; and if a logical-AND of both said vertical motion vector component $h_1$ and said horizontal motion vector component $h_0$ are true, then the step of adding is such that a constant of minus-three is added to said DC coefficient, otherwise a constant of zero is added.

5. The method of claim 4, wherein:

the step of adding is such that a new DC coefficient is formed for the step of transforming that includes a correction term for a set of predicted pixels calculated by a two-step predictor.

6. An MPEG-2 decoder, comprising:
a header parser for separating an MPEG-2 datastream into a motion vector datastream and a coefficients datastream;
a motion vector calculator connected to receive said motion vector datastream and for providing a vertical motion vector component $h_1$ and a horizontal motion vector component $h_0$;
a coefficients decoder connected to receive said coefficients datastream and for deriving a DC coefficient and a plurality of AC coefficients with a variable length decoder, a run length decoder, and an inverse quantization unit;
a two-step half-pixel prediction processor connected to receive a motion vector output from the motion vector calculator, and for providing a predicted frame with a rounding error that occurs when said predicted frame is used as a reference frame in a subsequent prediction;
a logic unit connected to receive said DC coefficient and said vertical motion vector component $h_1$ and a horizontal motion vector component $h_0$, and providing for a modification of said DC coefficient to produce a modified DC coefficient that is dependent on said vertical motion vector component $h_1$ and said horizontal motion vector component $h_0$;
an inverse discrete cosine transformer connected to receive said modified DC coefficient from the logic unit and plurality of AC coefficients from the coefficients decoder; and
a combiner for summing an output of the two-step half-pixel prediction processor and the inverse discrete cosine transformer, and for providing a series of frames;
wherein, said DC coefficient is modified before entering the inverse discrete cosine transformer in a way that results in a zeroing out of pumping artifacts in said frames that would otherwise be caused by rounding errors that occur in the two-step half-pixel prediction processor.

7. The MPEG-2 decoder of claim 6, wherein:
the logic unit is such that if both said vertical motion vector component $h_1$ and said horizontal motion vector component $h_0$ are true, then the adder uses a constant of minus-three which is added to said DC coefficient, otherwise a constant of zero is added.

8. The MPEG-2 decoder of claim 6, wherein:
the logic unit is such that said modified DC coefficient includes a correction term for a set of predicted pixels calculated by the two-step half-pixel prediction processor.

* * * * *